US008046144B2

(12) United States Patent
Lowe et al.

(10) Patent No.: US 8,046,144 B2
(45) Date of Patent: Oct. 25, 2011

(54) SYSTEMS AND METHODS FOR NON-LINEAR PROPORTIONAL AND DERIVATIVE CONTROL DURING VEHICLE GARAGE SHIFTS

(75) Inventors: Gary Lowe, Troy, MI (US); Libo Fan, Lake Orion, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1155 days.

(21) Appl. No.: 11/768,334

(22) Filed: Jun. 26, 2007

(65) Prior Publication Data

US 2009/0005218 A1 Jan. 1, 2009

(51) Int. Cl.
*G06F 7/00* (2006.01)
*G06F 17/00* (2006.01)

(52) U.S. Cl. ........... 701/68; 701/67; 701/70; 701/71; 477/116; 477/169; 477/120; 477/176; 475/43; 475/123

(58) Field of Classification Search ............ 701/67, 701/70–71, 58; 477/70, 121, 120, 176; 475/43, 475/123; 192/3.51; 700/28
See application file for complete search history.

(56) References Cited

U.S. PATENT DOCUMENTS

| | | | | | |
|---|---|---|---|---|---|
| 4,753,309 | A | * | 6/1988 | Marumoto et al. | 180/446 |
| 4,875,391 | A | * | 10/1989 | Leising et al. | 477/155 |
| 5,152,192 | A | * | 10/1992 | Koenig et al. | 477/120 |
| 5,211,080 | A | * | 5/1993 | Leising et al. | 475/123 |
| 5,251,512 | A | * | 10/1993 | Koenig et al. | 477/120 |
| 5,413,539 | A | * | 5/1995 | Leonard et al. | 475/63 |
| 7,854,683 | B2 | * | 12/2010 | DeGeorge et al. | 477/176 |
| 2007/0287594 | A1 | * | 12/2007 | DeGeorge et al. | 477/176 |
| 2009/0005218 | A1 | * | 1/2009 | Lowe et al. | 477/116 |

FOREIGN PATENT DOCUMENTS

| | | | | |
|---|---|---|---|---|
| JP | 60139955 | A | * | 7/1985 |
| JP | 60190655 | A | * | 9/1985 |
| JP | 01175528 | A | * | 7/1989 |
| JP | 04175565 | A | * | 6/1992 |
| JP | 06255382 | A | * | 9/1994 |

OTHER PUBLICATIONS

Sharing Software with ROS [ROS Topics]; Cousins, S.; Gerkey, B.; Conley, K.; Garage, W.; Robotics & Automation Magazine, IEEE; vol. 17, Issue: 2; Digital Object Identifier: 10.1109/MRA.2010.936956; Publication Year: 2010, pp. 12-14.*

(Continued)

*Primary Examiner* — Cuong H Nguyen
(74) *Attorney, Agent, or Firm* — Ralph E. Smith (57) ABSTRACT

The present disclosure utilizes Non-linear Proportional and Derivative (NLPD) control on a duty cycle of an applying clutch for stationary and rolling vehicle garage shifts. The applying clutch can be engaged by as electrically activated solenoid valve, and the present disclosure utilizes NLPD control to adjust the duty cycle of the solenoid to provide a smooth vehicle garage shift engagement. The present disclosure utilizes a control algorithm based on turbine speed, turbine acceleration, and output speed. The present disclosure can utilize an existing vehicle control unit, such as an engine control unit (ECU), transmission control unit (TCU), or the like, to receive turbine speed measurements, to calculate the solenoid duty cycle using NLPD control on the turbine speed acceleration error, and to adjust the solenoid driver on the solenoid valve.

15 Claims, 5 Drawing Sheets

OTHER PUBLICATIONS

A Development of the System to Prevent Unintended Sudden Acceleration by Controlling the Transmission of a Vehicle Dong-Chual Kang; Sang-Bong Yang; Jong-Hwa Lee; Chang-Woo Lee; Sang-Bock Cho; Strategic Technology, The 1st International Forum on; Digital Object Identifier: 10.1109/IFOST.2006.312233; Publication Year: 2006 , pp. 14-15.*

Pneumatic electronic braking assistance system using high-speed valves; Wang, Jianqiang; Yang, Bo; Li, Shengbo; Zhang, Dezhao; Li, Keqiang; Vehicular Electronics and Safety (ICVES), 2010 IEEE International Conference on; Digital Object Identifier: 10.1109/ICVES.2010.5550941; Publication Year: 2010 , pp. 59-64.*

Speed Control System Based on Improved Fuzzy-PID Hybrid Control for Direct Current Motor; Jinfeng Xiao; Biwen Li; Dao Zhou; Jun Chai; Lei Zhang; Digital Manufacturing and Automation (ICDMA), 2010 International Conference on; vol. 2 Digital Object Identifier: 10.1109/ICDMA.2010.28; Publication Year: 2010 , pp. 391-394.*

EGR-VGT Control and Tuning for Pumping Work Minimization and Emission Control; Wahlström, J.; Eriksson, L.; Nielsen, L.; Control Systems Technology, IEEE Transactions on; vol. 18 , Issue: 4; Digital Object Identifier: 10.1109/TCST.2009.2031473; Publication Year: 2010 , pp. 993-1003.*

Microcontroller based automation of variable electronic speed governor; Telaprolu, M.K.; Sarma, V.V.; Varun, K.; Ratnakanth, E.K.; Rao, S.N.; Banda, V.; Vehicular Electronics and Safety (ICVES), 2009 IEEE International Conference on; Digital Object Identifier: 10.1109/ICVES.2009.5400228; Publication Year: 2009 , pp. 151-155.*

Design of Solenoid Salve Power; Yang Jun; Chen Ruilong; Zhang Tai; E-Product E-Service and E-Entertainment (ICEEE), 2010 International Conference on; Digital Object Identifier: 10.1109/ICEEE.2010.5661276; Publication Year: 2010 , pp. 1-4.*

Experimental Investigation for Two-valve Control System Characters; Liu Yongfeng; Qiu Tao; Yang Jianwei; Sun Jianmin; Zhou Qinhui; Intelligent Computation Technology and Automation (ICICTA), 2011 International Conference on; vol. 1 Digital Object Identifier: 10.1109/ICICTA.2011.118; Publication Year: 2011 , pp. 424-426.*

* cited by examiner

SYSTEMS AND METHODS FOR NON-LINEAR PROPORTIONAL AND DERIVATIVE CONTROL DURING VEHICLE GARAGE SHIFTS

FIELD OF THE DISCLOSURE

The present disclosure relates generally to systems and methods for improving vehicle garage shifts. More specifically, the present disclosure relates to systems and methods for improving stationary and rolling vehicle garage shifts through the use of Non-Linear Proportional and Derivative (NLPD) control of the duty cycle of an applying clutch for the vehicle garage shift.

BACKGROUND OF THE DISCLOSURE

Vehicle garage shifts include stationary garage shifts, such as shifts from Neutral/Park-to-Drive (N-D) and Neutral/Park-to-Reverse (N-R), and rolling garage shifts, such as shifts from Drive-to-Reverse (D-R) and Reverse-to-Drive (R-D). Vehicle transmissions include a plurality of clutches, which are mechanisms for transmitting rotational energy from the engine to the wheels. The plurality of clutches are selectively engaged and disengaged to shift the vehicle's transmission into the desired gear ratio, such as when performing a stationary or rolling garage shift. A single applying clutch can be applied to either engage reverse or first gear to perform N-R or N-D garage shifts, respectively. The N-R and N-D garage shifts are controlled shifts. During these shifts, when hydraulic fluid fills the applying clutch, the clutch connects the engine to the drive shaft, and, as a result, reaction torque causes the powertrain case to wind in an opposite direction from the engine output shaft rotation. Eventually, the powertrain case is balanced by the mount system. Since this process happens in a fraction of a second, it generates a garage shift bump felt by vehicle occupants. Additionally, the rolling D-R and R-D shifts will generate a shudder or even bigger garage shift bump because of the vehicle direction change.

BRIEF SUMMARY OF THE DISCLOSURE

In various exemplary embodiments, the present disclosure improves stationary and rolling garage shifts through the use of Non-Linear Proportional and Derivative (NLPD) control of a duty cycle of an applying clutch for the vehicle garage shift. For a stationary garage shift, a single clutch is applied to engage either reverse or first gears from park/neutral. For a rolling garage shift, one or more clutches are applied to engage from reverse to drive and drive to reverse. These clutches are engaged by means of an electrically activated duty cycle controlled solenoid valve, such as Pulse Width Modulated (PWM) or Variable Force Solenoid (VPS), flowing transmission oil to the clutch. The clutches are "fast" filled by turning the solenoid full on for a period of time just short of the "touch point." Following this, the solenoid is duty cycled at a "fill" duty cycle until the turbine speed begins to separate from the engine speed. At this point, a closed-loop duty cycle is used to control the rate of turbine speed change by using NLPD control of the duty cycle as the desired gear is engaged. Advantageously, the present disclosure uses a closed loop control to modify the duty cycle applied to achieve smoother stationary and rolling engagements.

In an exemplary embodiment of the present disclosure, a non-linear proportional and derivative control method to adjust a duty cycle of an applying clutch for a garage shift includes turning a solenoid on for a period of time responsive to a garage shift to a desired gear, applying a duty cycle to the solenoid until a turbine speed begins to separate from an engine speed, and utilizing non-linear proportional and derivative control to adjust the duty cycle to control a rate of turbine speed change as the desired gear is engaged. The non-linear proportional and derivative control includes determining, turbine acceleration error, wherein the turbine acceleration error is a difference between measured turbine acceleration and desired turbine acceleration, computing a rate of change of the turbine acceleration error, and selecting a change in duty cycle responsive to the turbine acceleration and the rate of change of the turbine acceleration error. The non-linear proportional and derivative control can further include determining whether the garage shift is a rolling garage shift or a stationary garage shift, and adjusting the duty cycle by the change in duty cycle, wherein the change in duty cycle is subtracted from the duty cycle for the rolling garage shift and the change in duty cycle is added to the duty cycle for the stationary garage shift. The determining step selects the stationary garage shift unless the rolling garage shift is detected, and the rolling garage shift is detected based upon a turbine speed transitioning through zero and by comparing one or more of turbine speed to a turbine speed threshold value, transmission output speed to a transmission output speed threshold value, and turbine acceleration to a turbine acceleration threshold value. The adjusting the duty cycle step includes adjusting one of a pulse-width modulated and a variable force solenoid valve. Optionally, the non-linear proportional and derivative control is repeated until the desired gear is engaged. The change in duty cycle is selected responsive to the sign of the rate of change of the turbine acceleration error and the sign and magnitude of the turbine acceleration error.

Optionally, the change in duty cycle is set equal to one of four equations, $f_{1\delta DC}(\Delta a)$, $f_{2\delta DC}(\Delta a)$, $f_{3\delta DC}(\Delta a)$, and $f_{4\delta DC}(\Delta a)$, where $\delta DC$ is the change in duty cycle and $\Delta a$ is the turbine acceleration. The change in duty cycle is set equal to $f_{1\delta DC}(\Delta a)$ when the rate of change of the turbine acceleration error is positive and the turbine acceleration error is greater than or equal to zero. The change in duty cycle is set equal to $-f_{2\delta DC}(\Delta a)$ when the rate of change of the turbine acceleration error is positive and the turbine acceleration error is less than zero. The change in duty cycle is set equal to $f_{3\delta DC}(\Delta a)$ when the rate of change of the turbine acceleration error is negative or equal to zero and the turbine acceleration error is greater than or equal to zero. The change in duty cycle is set equal to $-f_{4\delta DC}(\Delta a)$ when the rate of change of the turbine acceleration error is negative or equal to zero and the turbine acceleration error is less than zero. These four equations are adjusted to provide a smooth engagement during one of a rolling and stationary garage shift based upon a vehicle's characteristics.

In another exemplary embodiment of the present disclosure, a vehicle control unit configured to adjust a duty cycle of a solenoid valve of an applying clutch for a garage shift includes input and output interfaces connected to a solenoid driver and a sensor, and a processor connected to the input and output interfaces and a data store. The processor is configured to detect a rolling and stationary garage shift, activate the solenoid driver to engage a solenoid valve, wherein the solenoid valve is configured, to engage a clutch, receive turbine speed measurements from the sensor, and perform non-linear proportional and derivative control to adjust the duty cycle. Optionally, the sensor includes a transmission turbine speed sensor configured to measure a speed of a transmission turbine. The processor detects the rolling and stationary garage shift responsive to measurements from the turbine speed sensor. Activating the solenoid driver includes turning the driver full on for a time period and implementing a fill duty cycle on the driver alter the time period. The non-linear proportional and derivative control includes adjusting the fill duty cycle responsive to received turbine speed measurements and calculations of turbine acceleration, turbine acceleration error, and rate of change of turbine acceleration error, and the turbine acceleration error is a difference between measure turbine acceleration and a desired turbine acceleration. Adjusting the fill duty cycle includes calculating a change in duty cycle responsive turbine acceleration error and rate of change of turbine acceleration error, adjusting the fill duty cycle by the change in duty cycle, wherein the adjusted duty cycle includes a current duty cycle, and repeating the changing and adjusting steps to adjust the current duty cycle until a desired gear is engaged.

In yet another exemplary embodiment of the present disclosure, a solenoid valve duty cycle adjustment method utilizing non-linear proportional and derivative control to minimize turbine acceleration error during garage shifts includes measuring turbine acceleration, determining turbine acceleration error, wherein the turbine acceleration error is a difference between measured turbine acceleration and desired turbine acceleration, computing a rate of change of turbine acceleration error, selecting a change in duty cycle responsive to the turbine acceleration error and the rate of change of the turbine acceleration error, adjusting the solenoid valve duty cycle by the change in duty cycle, and repeating the measuring, determining, computing, selecting, and adjusting steps until a desired gear ratio is engaged. The change in duty cycle is selected responsive to the sign of the rate of change of the turbine acceleration error and the sign and magnitude of the turbine acceleration error. The adjusting step includes determining whether the garage shift is a rolling garage shift, wherein the garage shift includes a stationary garage shift unless the rolling garage shift is detected, for the rolling garage shift, subtracting the change in duty cycle from the solenoid valve duty cycle, and for the stationary garage shift, adding the change in duty cycle to the solenoid valve duty cycle. The rolling garage shift is detected based upon a turbine speed transitioning through zero and by comparing one or more of turbine speed to a turbine speed threshold value, transmission output speed to a transmission output speed threshold value, and turbine acceleration to a turbine acceleration threshold value.

BRIEF DESCRIPTION OF THE DRAWINGS

The present disclosure is illustrated and described herein with reference to the various drawings, in which like reference numbers are used to denote like system components and/or method steps, respectively, and in which.

DETAILED DESCRIPTION OF THE DISCLOSURE

In various exemplary embodiments, the present disclosure utilizes NLPD control of a duty cycle of an applying clutch for stationary and rolling garage shifts. The applying clutch can be engaged by an electrically activated PWM solenoid valve, and the present disclosure utilizes PD control to adjust the duty cycle of the solenoid valve to provide a smooth garage shift engagement. The present disclosure can utilize an existing vehicle control unit, such as an engine control unit (ECU), transmission control unit (TCU), or the like, to receive turbine speed measurements, to calculate duty cycle adjustments using NLPD control on the turbine speed acceleration error, and to adjust the solenoid driver on the solenoid valve.

Figure 1:
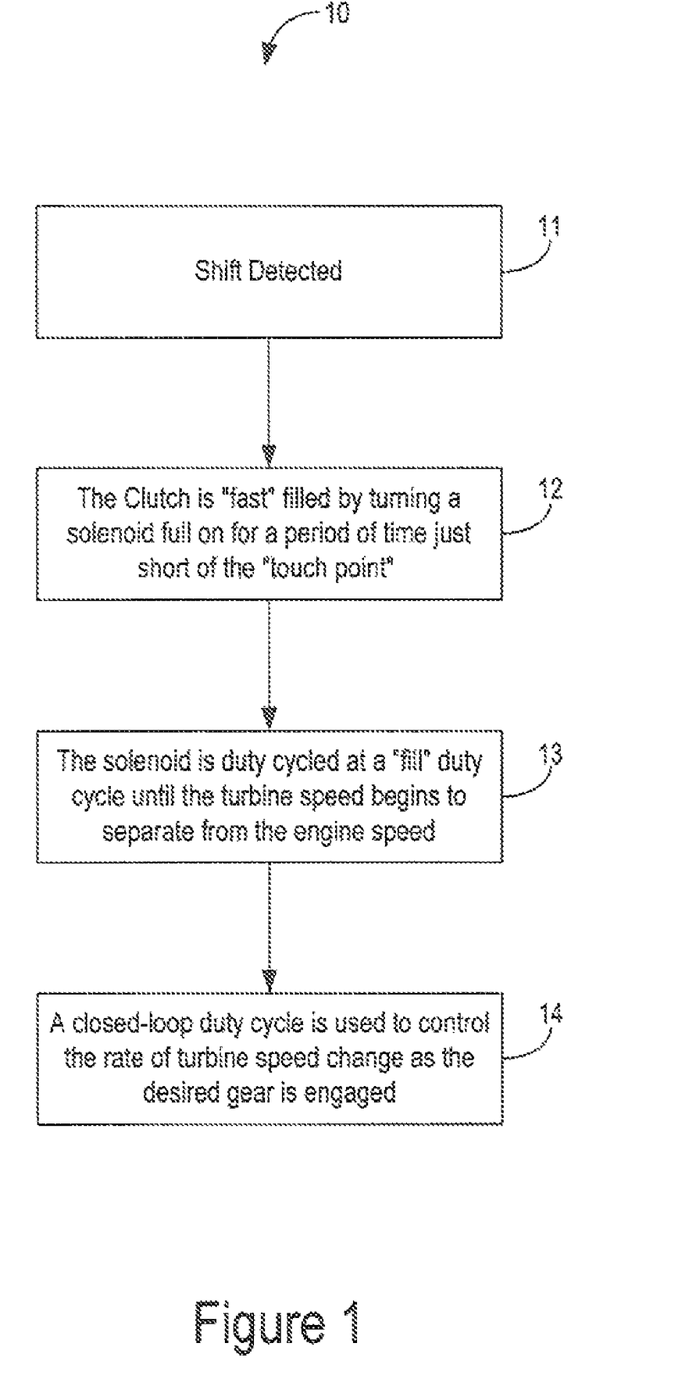
FIG. 1 is a flowchart illustrating an exemplary embodiment of a garage shift utilizing NLPD control of a duty cycle of an applying clutch, according to the present disclosure.

Referring to FIG. 1, a flowchart illustrates an exemplary embodiment of a garage shift 10 utilizing NLPD control of a duty cycle of an applying clutch, according to the present disclosure. A shift is detected (step 11). The clutch, i.e. the applying clutch for the shift, is fast filled by turning a solenoid fell on for a period of time just short, of the solenoid's touch point (step 12). Transmission fluid flows to the clutch when the solenoid valve is full on. In step 12, the period of time is the time it takes to fill and partially stroke the clutch piston prior to the "touch point". For example, this period of time can typically be 200 to 400 ms, depending on the clutch volume. The touch point is the point at which a clutch piston is fully stroked and clutch discs begin to carry torque.

Next, the solenoid is duty cycled at a "fill" duty cycle until the turbine speed begins, to separate from the engine speed (step 13). The "fill" duty cycle is the duty cycle after the fast fill period of time but before the speed change that is designed to allow the clutch to build capacity at a more gradual rate. This allows the speed change to start in a more controlled fashion. During the transition from N-D or N-R, the turbine speed follows the engine speed very closely. When the applying clutch gets capacity it begins to pull the turbine away from the engine thus creating an increasing speed difference between the engine speed and turbine speed. This difference can be based on engine speed and transmission speed measurements, such as from sensors. At this point, the present disclosure utilizes a closed-loop duty cycle with NLPD control to control the rate of turbine speed change as the desired gear is engaged (step 14). The NLPD duty cycle control provides a smoother engagement improving the garage shift quality.

Figure 2:
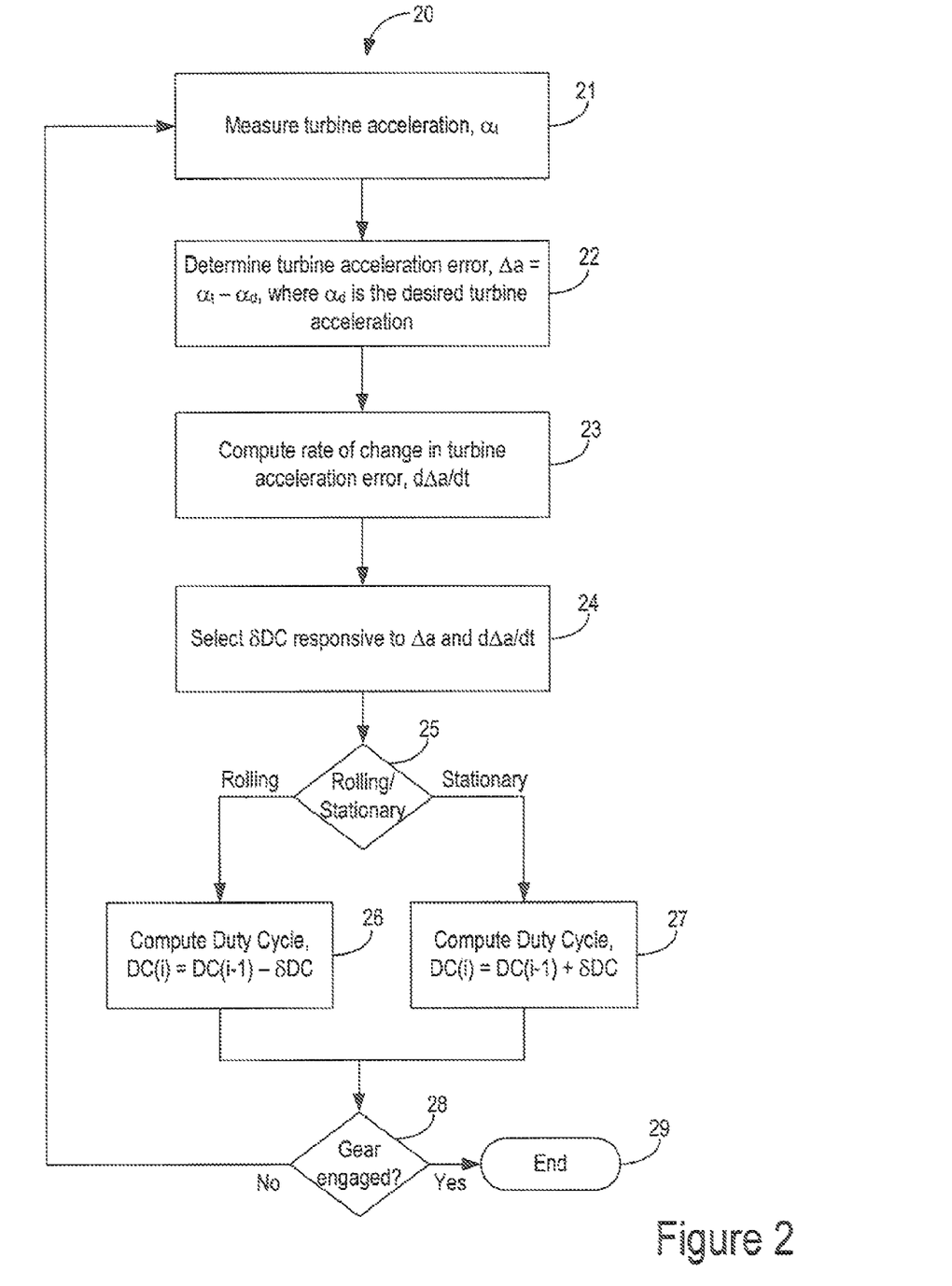
FIG. 2 is a flowchart illustrating an exemplary embodiment of a NLPD control calculation of a duty cycle of an applying clutch, according to the present disclosure.

Referring to FIG. 2, a flowchart illustrates an exemplary embodiment of a NLPD control calculation 20 on a duty cycle of an applying clutch, according to the present disclosure. The following variables are utilized in FIG. 2 for the PD control calculation:

| Variable | Description |
| --- | --- |
| DC | Duty Cycle |
| δDC | Change in Duty Cycle |
| Δa | Turbine acceleration error |
| $α_t$ | Turbine acceleration |
| $α_d$ | Desired turbine acceleration |

| Variable | Description |
| --- | --- |
| dΔa/dt | Rate of change in turbine acceleration error |

DC represents the duty cycle applied to the solenoid valve of the applying clutch through a solenoid driver, such as to a PWM or VFS. The DC is indexed as DC(i) with i representing each iteration of the NLPD control calculation. δDC represents the incremental change in the duty cycle through each iteration of the NLPD control calculation. Δa represents the turbine acceleration error and is defined as the difference between the actual turbine acceleration, $α_t$, and the desired turbine acceleration, $α_d$. The actual turbine acceleration, $α_t$, is based upon actual measurements from one or more sensors. The desired turbine acceleration, $α_d$, represents the desired value of turbine acceleration for a smooth garage shift engagement, i.e., a value that minimizes the garage shift bump. The rate of change in turbine acceleration error, dΔa/dt, represents the derivative of the calculated turbine acceleration error for each iteration through the NLPD control calculation.

Figure 3A:
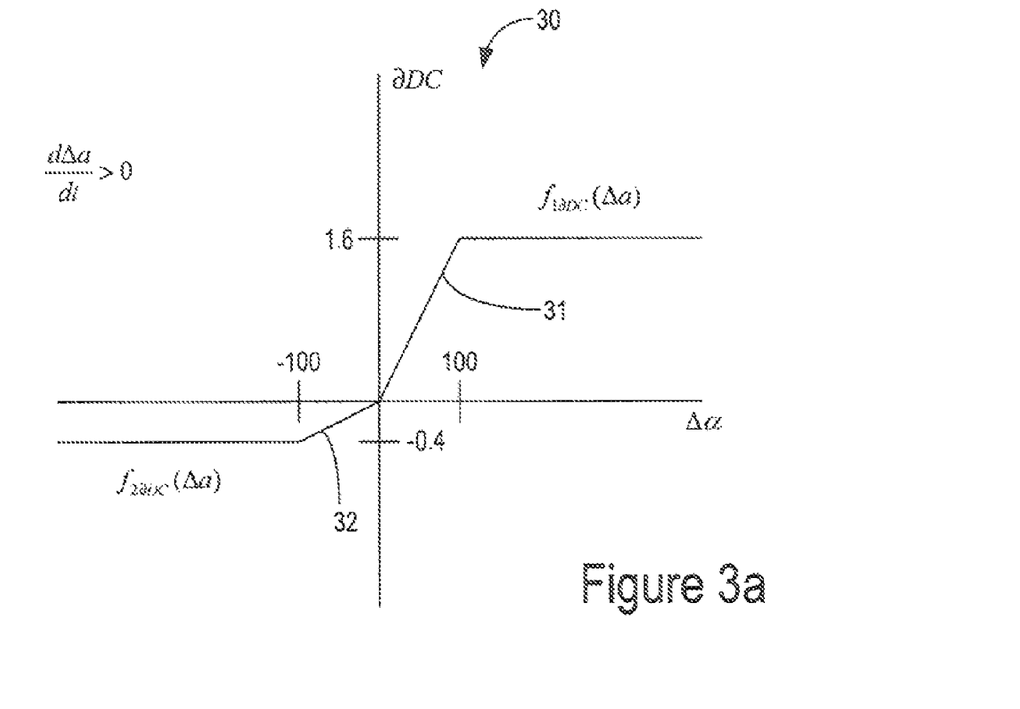
FIGS. 3a and 3b are graphs illustrating exemplary equations for selecting the change in duty cycle, δDC, based on the turbine acceleration error, Δa, and the rate of change of the turbine acceleration error, dΔa/dt, according to the present disclosure.
Figure 3B:
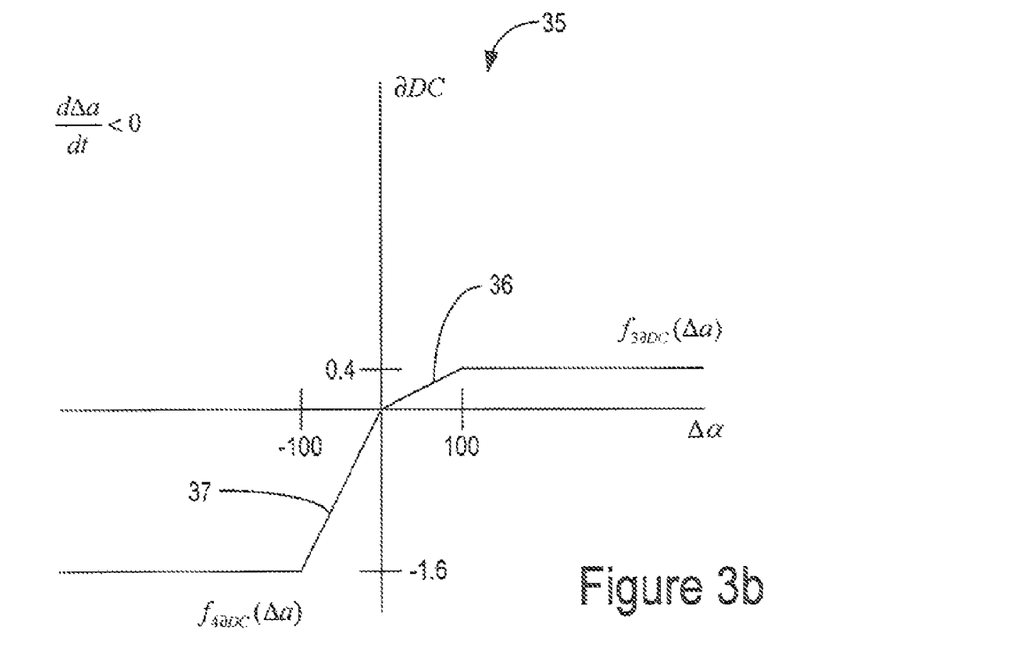

The NLPD control calculation 20 begins with a measurement of the turbine acceleration, $α_t$ (step 21). This measurement can be taken by a sensor, such as a turbine speed sensor, configured to measure turbine speed. The turbine acceleration error, Δa, is determined as the difference between the measured turbine acceleration, $α_t$, and the desired turbine acceleration, $α_d$ (step 22). The NLPD control calculation 20 minimizes the turbine acceleration error, Δa, through NLPD control to provide smoother stationary and rolling engagements. The rate of change in the turbine acceleration error, dΔa/dt, is computed (step 23). The change in duty cycle, δDC, is selected responsive to Δa and dΔa/dt (step 24). For example, the present disclosure can utilize a different duty cycle change, δDC, depending on both the sign and magnitude, of both Δa and dΔa/dt. FIGS. 3a and 3b illustrate an exemplary embodiment for selecting δDC based on Δa and dΔa/dt.

Figure 4:
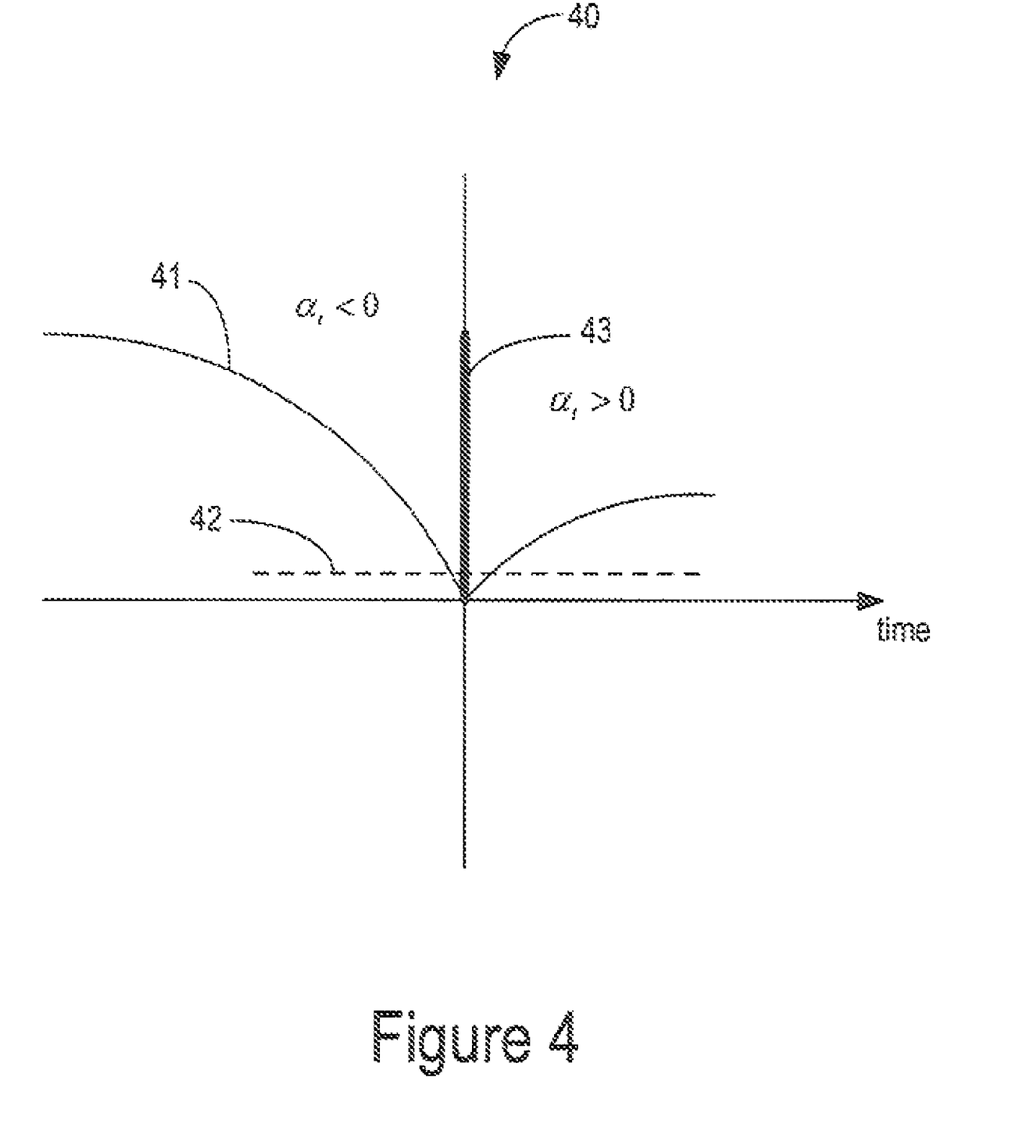
FIG. 4 is a graph illustrating an exemplary detection algorithm for detecting a rolling garage shift, according to the present disclosure.

Next, the NLPD control calculation 20 determines whether the garage shift is a rolling, e.g. rolling D-R or rolling R-D, or a stationary shift, e.g. N-D or N-R (step 25). A stationary garage shift is assumed unless a rolling shift is detected. For a rolling garage shift, the detection requires several conditions since the turbine speed sensor cannot determine the rolling shift because the turbine speed direction is still the same after the initiation of a rolling shift. For example, a rolling shift can be detected by comparing turbine speed, acceleration, and output speed against threshold values. FIG. 4 illustrates an exemplary embodiment of the detection of a rolling garage shift.

If the shift is a rolling shift, then the duty cycle is computed as DC(i)=DC(i-1)-δDC (step 26). If the shift is a stationary shift, then the duty cycle is computed as DC(i)=DC(i-1)+δDC (step 27). Steps 26 and 27 collectively utilize a recursive equation to compute adjustments to the duty cycle, i.e. the duty cycle, DC(i), in the current iteration is set to the previous duty cycle, DC(i-1), with an adjustment equal to δDC where δDC is calculated based on NLPD control. After adjusting the duty cycle in steps 26 or 27, the NLPD control calculation 20 checks if the desired gear has been engaged (step 28). If so, then the NLPD control calculation 20 ends (step 29). If not, then the NLPD control calculation 20 performs another iteration by returning to step 21.

Referring to FIGS. 3a and 3b, these graphs illustrate exemplary equations 30 and 35 for selecting the change in duty cycle, δDC, based on the turbine acceleration error, Δa, and the rate of change of the turbine acceleration error, dΔa/dt. The graphs illustrate four equations, $f_{1δDC}(Δa)$, $f_{2δDC}(Δa)$, $f_{3δDC}(Δa)$, and $f_{4δDC}(Δa)$. These equations were determined based on a vehicle's transmission and engine characteristics to provide smooth shift engagements based on the NLPD control calculation 20 presented herein. Those of ordinary skill in the art will recognize that the equations for selecting the change in duty cycle can be modified as required by the specifics of the vehicle's engine and transmission, and that the graphs provide an exemplary embodiment of such equations.

Line 31 in the top graph illustrates $f_{1δDC}(Δa)$ which sets δDC equal to 1.6/100−Δa for a value of Δa between 0 and 100, and δDC=1.6 for Δa>100. Line 32 in the top graph illustrates $f_{2δDC}(Δa)$ which sets δDC equal to 0.4/100−Δa for a value of Δa between 0 and −100, and δDC=−0.4 for Δa<−100. Line 36 in the bottom graph illustrates $f_{3δDC}(Δa)$ which sets δDC equal to 0.4/100−Δa for a value of Δa between 0 and 100, and δDC=0.4 for Δa>100. Line 37 in the bottom graph illustrates $f_{4δDC}(Δa)$ which sets δDC equal to 1.6/100−Δa for a value of Δa between 0 and −100, and δDC=−1.6 for Δa<−100.

In an exemplary embodiment, the change in duty cycle, δDC, is set as follows:

$$\begin{aligned}
δDC &= +f_{1δDC}(Δa) \quad \text{with } dΔa/dt > 0 \text{ and } Δa \geq 0 \\
&= +f_{3δDC}(Δa) \quad \text{with } dΔa/dt \leq 0 \text{ and } Δa \geq 0 \\
&= -f_{4δDC}(Δa) \quad \text{with } dΔa/dt < 0 \text{ and } Δa < 0 \\
&= -f_{2δDC}(Δa) \quad \text{with } dΔa/dt \geq 0 \text{ and } Δa < 0
\end{aligned}$$

Accordingly, $f_{1δDC}$ is applied when the turbine acceleration is greater than desired acceleration and the turbine acceleration is heading away from the desired acceleration. $f_{2δDC}$ is applied when the turbine acceleration is less than desired acceleration and the turbine acceleration is heading toward to the desired acceleration. $f_{3δDC}$ is applied when the turbine acceleration is greater than desired acceleration and the turbine acceleration is heading toward to the desired acceleration. $f_{4δDC}$ applied when the turbine acceleration is less than desired acceleration and the turbine acceleration is heading away from the desired acceleration.

Referring to FIG. 4, a graph illustrates an exemplary detection algorithm 40 for detecting a rolling garage shift according to the present disclosure. For rolling garage shifts, the sensor, such as a turbine speed sensor, cannot indicate the turbine speed direction. The graph illustrates turbine speed 41 over time for an exemplary rolling garage shift. The acceleration, $α_t$, indicates a direction change for the turbine speed. The acceleration, $α_t$, is less than zero as the turbine speed 41 decreases, and then the acceleration, $α_t$, is greater than zero once the turbine speed 41 hits zero and begins to increase again, i.e., in the opposite direction.

A determination is made as to whether the vehicle is moving in the same or opposite direction as the intended garage shift, i.e., rolling forward and engaging drive or rolling backwards and engaging reverse. In an exemplary embodiment, this determination is made based upon turbine speed 41 and whether it has transitioned through zero along with other conditions. For example, the other conditions can include comparing turbine speed, $N_t$, to a threshold, comparing transmission output speed, $N_o$, to a threshold, and comparing turbine acceleration, $|\alpha_t|$, to a threshold. A rolling shift can be detected by exceeding one or more of these thresholds.

In one exemplary embodiment, a rolling garage shift can be detected when $N_t$ is less than a threshold, $|\alpha_t|$ is less than a threshold, and $N_o$ is greater than a threshold. For example, these thresholds can be in one exemplary embodiment set to $N_t<50$, $|\alpha_t|<100$, and $N_o>40$, and a determination of all three conditions represents the detection of a rolling garage shift. In the detection algorithm 40, a rolling garage shift 43 is detected as the turbine speed 41 crosses a turbine speed threshold 42, and the magnitude of the turbine acceleration, $|\alpha_t|$, is less than an acceleration threshold. The rolling shift detection algorithm presented herein can be utilized in step 25 of NLPD control calculation 20 to detect a rolling shift.

Figure 5:
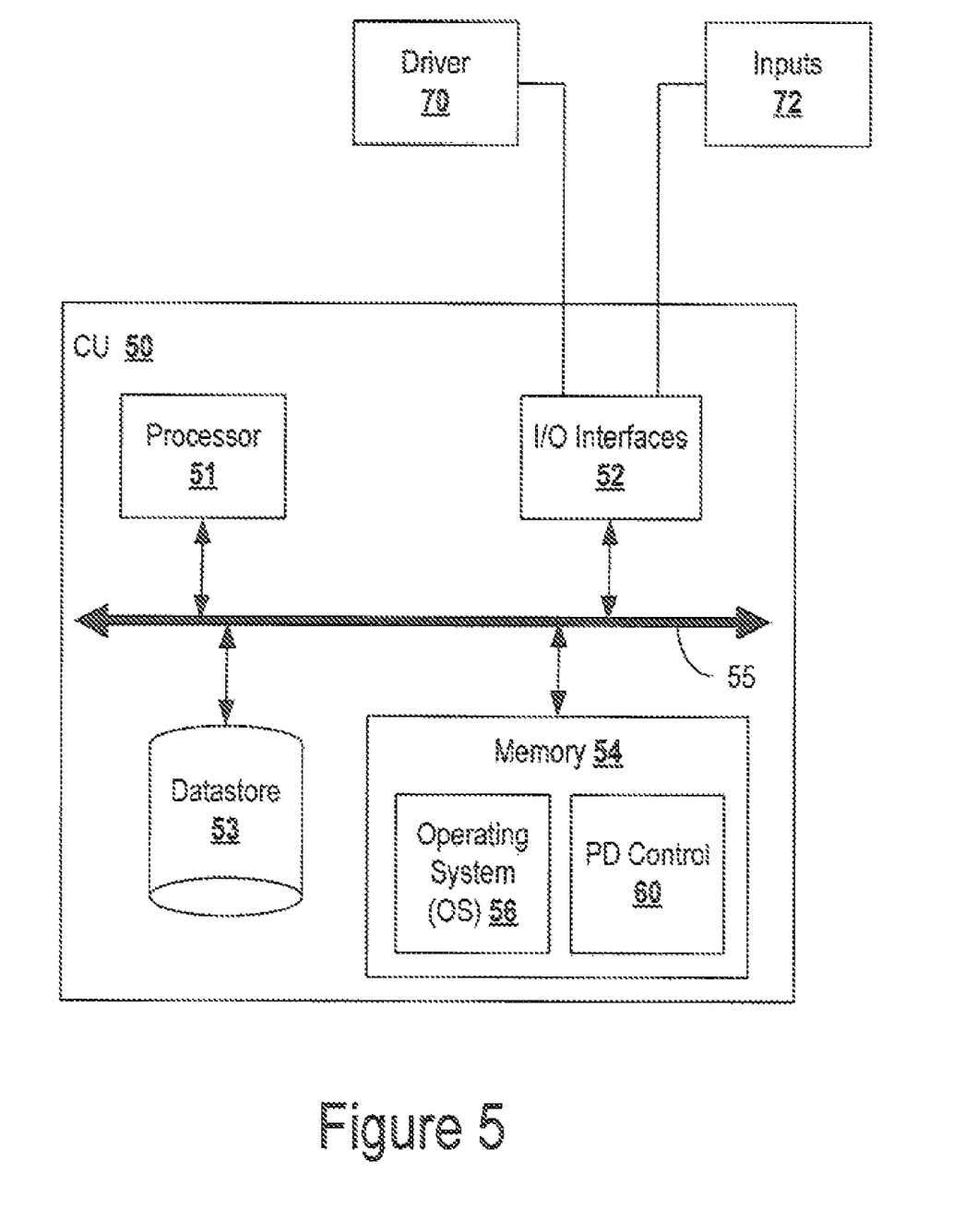
FIG. 5 is a block diagram illustrating a control unit (CU) configured to operate the PD control described herein, according to an exemplary embodiment of the present disclosure.

Referring to FIG. 5, a block diagram illustrates a control unit (CU) 50 configured to operate the NLPD control described herein, according to an exemplary embodiment of the present disclosure. The CU 50 can be an Engine Control Module (ECM) or Powertrain Control Unit/Module (PCU, PCM) if it controls both an engine and a transmission. The CU 50 is an electronic control unit which controls various aspects of an internal combustion engine's operation. For example, the CU 50 can control the quantity of fuel injected into each cylinder each engine cycle, the ignition timing, Variable Valve Timing (VVT), the level of boost maintained by the turbocharger (in turbocharged cars), and control other peripherals.

The CU 50 can be a digital computer that, in terms, of hardware architecture, generally includes a processor 51, input/output (I/O) interfaces 52, a data store 53, and memory 54. The components (51, 52, 53, and 54) are communicatively coupled via a local interface 55. The local interface 55 can be, for example, one or more buses or other wired or wireless connections, as is known in the art. The local interface 55 can have additional elements, which are omitted for simplicity, such as controllers, buffers (caches), drivers, repeaters, and receivers, among many others, to enable communications. Further, the local interface 55 can include address, control, and/or data connections to enable appropriate communications among the components described herein. The components (51, 52, 53, and 54) can be packaged in a single microchip or as separate devices connected through a circuit board or the like.

The processor 51 is a hardware device for executing software instructions. The processor 51 can be any custom made or commercially available processor, a central processing unit (CPU), an auxiliary processor among several processors associated with the CU 50, a semiconductor-based microprocessor (in the form of a microchip or chip set), a microcontroller, or generally any device for executing software instructions. When the CU 50 is in operation, the processor 51 is configured to execute software stored within the memory 54, to communicate data to and from the memory 54, and to generally control operations of the CU 50 pursuant to the software instructions.

The I/O interfaces 52 are used to receive input from and/or for providing system output to one or more devices or components. I/O interfaces 52 can include, for example, a serial port, a parallel port, a small computer system Interface (SCSI), a Controller Area Network bus (CANbus), a universal serial bus (USB) interface, and any other connection type as is known in the art. The I/O interfaces 52 are communicatively coupled to the processor 51, data store 53, and memory 54 through the local interface 55 providing communication to/from the CU 50 and various components and sensors in the vehicle.

The data store 53 can be used to store information received from the I/O interfaces 52, such as previous turbine speed measurements, turbine acceleration measurements, and the like. The data store 53 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store 53 may incorporate electronic, magnetic, optical, and/or other types of storage media.

The memory 54 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 54 can incorporate electronic, magnetic, optical, and/or other types of storage media. Note that the memory 54 can have a distributed architecture, where various components are situated remotely from one another, but can be accessed by the processor 51.

The software in memory 54 can include one or more software programs, each of which includes an ordered listing of executable instructions for implementing logical functions. In the example of FIG. 5, the software in the memory system 54 includes a suitable operating system (O/S) 56 and a PD control algorithm 60. The operating system 56 essentially controls the execution of other computer programs, such as the PD control algorithm 60 and other functions related to various aspects of a vehicle's operation, and provides scheduling, input-output control to/from the I/O interfaces 52, file and data management, memory management, and communication control and related services.

In an exemplary embodiment of the present disclosure, the I/O interfaces 52 are connected to a solenoid driver 70 and a plurality of inputs 72. The solenoid driver 70 is configured to electrically activate solenoid valve flowing transmission oil to a clutch, such as an applying clutch for a stationary or rolling garage shift. The plurality of inputs 72 can include connections to various sensors distributed throughout the vehicle. For example, the inputs 72 can include a turbine speed sensor or the like.

The CU 50 is configured to receive turbine speed measurements through the inputs 72, and to control the duty cycle applied to the solenoid driver 70 based upon the NLPD algorithms presented herein. The NLPD control algorithm 60 can include instructions to operate the various aspects of the NLPD algorithms presented in the flowcharts of FIGS. 1 and 2. Additionally, the data store 53 and/or memory 54 can include the various thresholds described herein, and the previous measurements and calculations required to perform the NLPD control loop.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A non-linear proportional and derivative control method to adjust a duty cycle of an applying clutch for a garage shift, comprising using a processor to perform the steps of:

turning a solenoid on for a period of time responsive to a garage shift to a desired gear;

applying a duty cycle to the solenoid until a turbine speed begins to separate from an engine speed; and utilizing non-linear proportional and derivative control to adjust the duty cycle to control a rate of turbine speed change as the desired gear is engaged.

2. The non-linear proportional and derivative control method of claim 1, wherein the proportional and derivative control comprises:
  determining turbine acceleration error, wherein the turbine acceleration error comprises a difference between measured turbine acceleration and desired turbine acceleration;
  computing a rate of change of the turbine acceleration error; and
  selecting a change in duty cycle responsive to the turbine acceleration and the rate of change of the turbine acceleration error.

3. The non-linear proportional and derivative control method of claim 2, wherein proportional and derivative control further comprises:
  determining whether the garage shift is a rolling garage shift or a stationary garage shift;
  and adjusting the duty cycle by the change in duty cycle, wherein the change in duty cycle is subtracted from the duty cycle for the rolling garage shift and the change in duty cycle is added to the duty cycle for the stationary garage shift.

4. The non-linear proportional and derivative control method of claim 3, wherein the determining step selects the stationary garage shift unless the rolling garage shift is detected;
  and wherein the rolling garage shift is detected based upon a turbine speed transitioning through zero and by comparing one or more of turbine speed to a turbine speed threshold value, transmission output speed to a transmission output speed threshold value, and turbine acceleration to a turbine acceleration threshold value.

5. The non-linear proportional and derivative control method of claim 3, wherein the adjusting the duty cycle comprises adjusting one of a pulse-width modulated and a variable force solenoid valve.

6. The non-linear proportional and derivative control method of claim 2, wherein the non-linear proportional and derivative control is repeated until the desired gear is engaged.

7. The non-linear proportional and derivative control method of claim 2, wherein the change in duty cycle is selected responsive to a sign of the rate of change of the turbine acceleration error and the sign and magnitude of the turbine acceleration error.

8. The non-linear proportional and derivative control method of claim 7, wherein the change in duty cycle is set equal to one of four equations, $f_{1\delta DC}(\Delta a)$, $f_{2\delta DC}(\Delta a)$, $f_{3\delta DC}(\Delta a)$, and $f_{4\delta DC}(\Delta a)$, where $\delta DC$ comprises the change in duty cycle and $\Delta a$ comprises the turbine acceleration;
  wherein the change in duty cycle is set equal to $f_{1\delta DC}(\Delta a)$ when the rate of change of the turbine acceleration error is positive and the turbine acceleration error is greater than or equal to zero;
  wherein the change in duty cycle is set equal to $-f_{2\delta DC}(\Delta a)$ when the rate of change of the turbine acceleration error is positive and the turbine acceleration error is less than zero;
  wherein the change in duty cycle is set equal to $f_{3\delta DC}(\Delta a)$ when the rate of change of the turbine acceleration error is negative or equal to zero and the turbine acceleration error is greater than or equal to zero;
  and wherein the change in duty cycle is set equal to $-f_{4\delta DC}(\Delta a)$ when the rate of change of the turbine acceleration error is negative or equal to zero and the turbine acceleration error is less than zero.

9. The non-linear proportional and derivative control method of claim 8, wherein the four equations are adjusted to provide a smooth engagement during one of a rolling and stationary garage shift based upon a vehicle's characteristics.

10. A vehicle control unit configured, to adjust a duty cycle of a solenoid valve of an applying clutch for a garage shift, comprising: input and output interfaces connected to a solenoid driver and a sensor;
  and a processor connected to the input and output interfaces and a data store, wherein the processor is configured to: detect a rolling and stationary garage shift;
  activate the solenoid driver to engage a solenoid valve, wherein the solenoid valve is configured to engage a clutch;
  receive turbine speed measurements from the sensor,
  and perform non-linear proportional and derivative control to adjust the duty cycle.

11. The vehicle control unit of claim 10, wherein the sensor comprises a transmission turbine speed sensor configured to measure a speed of a transmission turbine.

12. The vehicle control unit of claim 11, wherein the processor detects the rolling and stationary garage shift responsive to measurements from the turbine speed sensor.

13. The vehicle control unit of claim 10, wherein activate the solenoid driver comprises turning the driver full on for a time period and implementing a fill duty cycle on the driver after the time period.

14. The vehicle control unit of claim 13, wherein the non-linear proportional and derivative control comprises adjusting the fill duty cycle responsive to received turbine speed measurements and calculations of turbine acceleration, turbine acceleration error, and rate of change of turbine acceleration error;
  and wherein the turbine acceleration error comprises a difference between measure turbine acceleration and a desired turbine acceleration.

15. The vehicle control unit of claim 14, wherein the adjusting the fill duty cycle comprises: calculating a change in duty cycle responsive turbine acceleration error and rate of change of turbine acceleration error;
  adjusting the fill duty cycle by the change in duty cycle, wherein the adjusted duty cycle comprises a current duty cycle;
  and repeating the changing and adjusting steps to adjust the current duty cycle until a desired gear is engaged.

* * * * *